United States Patent
Kerckhaert

(10) Patent No.: US 11,533,895 B2
(45) Date of Patent: Dec. 27, 2022

(54) HOOF RASP

(71) Applicant: KERCKHAERT HOEFIJZERFABRIEK B.V., Vogelwaarde (NL)

(72) Inventor: Michiel Petrus M. Kerckhaert, Moerbeke (BE)

(73) Assignee: KERCKHAERT HOEFIJZERFABRIEK B.V., Vogelwaarde (NL)

( * ) Notice: Subject to any disclaimer, the term of this patent is extended or adjusted under 35 U.S.C. 154(b) by 367 days.

(21) Appl. No.: 16/783,646

(22) Filed: Feb. 6, 2020

(65) Prior Publication Data

US 2020/0253183 A1 Aug. 13, 2020

(30) Foreign Application Priority Data

Feb. 8, 2019 (NL) ...................................... 1043146

(51) Int. Cl.
*A01L 11/00* (2006.01)
*A01L 15/00* (2006.01)

(52) U.S. Cl.
CPC ............... *A01L 15/00* (2013.01); *A01L 11/00* (2013.01)

(58) Field of Classification Search
CPC ......... A01L 11/00; A01L 15/00; B23D 71/04; B23D 71/06; B23D 71/08
See application file for complete search history.

(56) References Cited

U.S. PATENT DOCUMENTS

| | | | | |
|---|---|---|---|---|
| 10,088 A | * | 10/1853 | Powers | B23D 71/00 407/29.1 |
| 76,618 A | * | 4/1868 | Fisher | B23D 71/00 168/48.1 |
| 114,824 A | * | 5/1871 | Hyland | B23D 63/10 76/31 |
| 250,736 A | * | 12/1881 | Ingalsbe | A01L 11/00 168/48.1 |
| 279,750 A | * | 6/1883 | Harrison | B23D 71/00 407/29.1 |
| 806,962 A | * | 12/1905 | Ellis | B23D 71/00 407/29.14 |
| 1,170,950 A | * | 2/1916 | Ambicky | A01L 11/00 168/48.1 |

(Continued)

FOREIGN PATENT DOCUMENTS

| | | | | |
|---|---|---|---|---|
| DE | 20117786 U1 | * | 1/2002 | ............ B23D 71/04 |
| DE | 102008050804 A1 | * | 4/2010 | ........... A61B 17/164 |

OTHER PUBLICATIONS

NL Search Report, dated Oct. 9, 2019, from corresponding NL application No. 1043146.

(Continued)

*Primary Examiner* — Son T Nguyen
(74) *Attorney, Agent, or Firm* — Nixon & Vanderhye

(57) ABSTRACT

Disclosed is a hoof rasp for filing/rasping and tidying the hoof of a horse, including at least one rasping side provided with a rasping section with length L and width W between a rasp-free first and second end over a respective length L1 and L2, whereby the first end tapers into a tang intended for a handle and the second end is for holding the hoof rasp, whereby the rasping section, toward the second end, includes a narrowed area. Also disclosed is a method for filing/rasping a hoof with such a hoof rasp.

19 Claims, 1 Drawing Sheet

(56) References Cited

U.S. PATENT DOCUMENTS

| | | | | |
|---|---|---|---|---|
| 1,349,596 A | * | 8/1920 | Wosiewski | B25G 1/00 |
| | | | | 206/349 |
| 2,027,039 A | * | 1/1936 | Heller | B23D 73/00 |
| | | | | 407/29.1 |
| 2,089,619 A | * | 8/1937 | Ripley | B23D 71/00 |
| | | | | 407/29.1 |
| 2,362,491 A | * | 11/1944 | Linden | B23D 71/00 |
| | | | | 279/102 |
| 3,543,362 A | * | 12/1970 | Richard | C25D 1/00 |
| | | | | 407/29.14 |
| 3,950,832 A | * | 4/1976 | Blane | B23D 71/04 |
| | | | | 76/31 |
| 4,941,246 A | * | 7/1990 | Finnegan | B23D 71/04 |
| | | | | 279/42 |
| 5,919,007 A | * | 7/1999 | Brown | B23D 71/04 |
| | | | | 407/29.1 |
| 2007/0147963 A1 | * | 6/2007 | Critelli | B23D 73/12 |
| | | | | 407/29.1 |
| 2009/0205844 A1 | | 8/2009 | Althoff | |
| 2014/0060857 A1 | | 3/2014 | Ortega et al. | |

OTHER PUBLICATIONS

Written Opinion, dated Oct. 9, 2019, from corresponding NL application No. 1043146.

* cited by examiner

HOOF RASP

BACKGROUND OF THE INVENTION

Field of the Invention

The present invention relates to a hoof rasp, more specifically a flat oblong hoof rasp.

Description of the Related Art

When a hoof grows it needs to be shortened with farrier nippers, filed and smoothed with a hoof rasp (referred to as rasp in short).

A rasp has a rasping side for removing hoof material and a filing side for smoothing or finishing the hoof.

Such known rasp has a constant width and at the one end a narrow tang over which a handle can be slid. The other end is held with the other hand during rasping.

On both flat sides of the rasp there are rasping and filing sections which are provided with rasping and filing teeth respectively Rasping is done before the horseshoe is fitted. A disadvantage of rasping is that it takes some strength to initiate or start rasping.

Teeth are also provided on the sides of the rasp. The teeth are usually only provided on the level of the rasping section, there where they perform their function. The side is used to file/rasp the hoof on the level of the connection with the horseshoe after the horseshoe is fitted.

Typically, a rasp is made of a robust steel core and hardened teeth such that the rasp does not break easily. Consequently a rasp has a certain weight. On the one hand this weight is required for the quality feeling. On the other hand the weight may not be too high either. The weight needs to be balanced to be able to apply force on the rasp and get the mass moving.

A traditional rasp, such as shown in FIG. 1 for example, has a certain width and thickness over a particular length.

Wider rasps also exist, such as the rasp shown in FIG. 2. However, the disadvantages are the higher weight and the extra physical strength that is needed. Such rasps don't 'run' that well.

Yet another type of rasp is also a slightly wider rasp, such as for example shown in FIG. 3 with the same length as a traditional rasp. However, to compensate the weight this rasp is slightly thinner. Indeed, too heavy a weight is a disadvantage in terms of ease of use after all. The advantage of such a rasp is that there are more teeth such that a higher productivity is obtained while the weight is practically the same. Flat rasping/filing with a wider rasp is also easier. Such rasps sell well.

SUMMARY OF THE INVENTION

The purpose of the present invention (FIG. 4) is to provide a solution to the aforementioned and other disadvantages.

To this end, the invention relates to a hoof rasp for filing/rasping and tidying the hoof of a horse, comprising at least one rasping side provided with a rasping section with length L and width W between a rasp-free first and second end over a respective length L1 and L2, whereby the first end tapers into a tang intended for a handle and the second end is for holding the hoof rasp, whereby the rasping section, toward the second end, comprises a narrowed area with a length Lx and a width Wx which is less than the width W.

The advantages are that the rasp has a softer initial stroke. Because fewer teeth are provided, the rasp gets stuck less and it's easier to start rasping. Once rasping has started, rasping can be done on the wider most productive middle part, such that rasping can be done optimally. Once the rasping has picked up speed, more and intensive work in the middle part can be done. This is also a natural way of working.

By combining a soft initial stroke in the front part of the rasp and a productive central part in full width, the rasp as a whole is more productive and requires less physical strength.

By the combination of a narrow front part and a wide central part the weight of the rasp is comparable to a wide thinner rasp.

In a certain embodiment of a hoof rasp according to the invention the teeth of the rasping section in the narrowed area with length Lx are finer than the teeth on the rasping section in the area with length L-Lx. Consequently, the initial stroke can be even softer.

However, this is not necessary. The rasping section can also be made with one type of toothing over both the initial stroke section and the fast section.

The hoof rasp is further provided with a filing side.

In a preferred embodiment of a hoof rasp according to the invention, the hoof rasp is provided with teeth over the area with length L-Lx on at least one side, and preferably on both sides, this is the fast rasping section. Indeed, only the side of this section has functionality.

In yet another preferred embodiment of a hoof rasp according to the invention, the rasping section comprises two adjoining areas whereby a first "fast" area has a constant width W and a length L-Lx, and a second narrowed or "initial stroke" area a constant width Wx which is less than W and a length Lx.

In a certain embodiment of a hoof rasp according to the invention the teeth are provided over the full width of the rasping section. However, the teeth of the rasping section can also stop at a (small) distance from the edge.

In a preferred embodiment of a hoof rasp according to the invention the length Lx of the narrowed "initial stroke" area is less than the length L-Lx. The start of the rasping is slightly more intense and requires slightly more energy, such that the rasping is done best over a shorter distance.

In a preferred embodiment of a hoof rasp according to the invention, the width Wx is symmetrically divided relative to the longitudinal centre line of the hoof rasp. This stimulates a stable grip. The narrowed "initial stroke" area could possibly also be made asymmetrically.

In a specific embodiment of a hoof rasp according to the invention the thickness of the hoof rasp is 4.5 mm.

In yet another specific embodiment of a hoof rasp according to the invention the total length of the hoof rasp is 426 mm.

In yet another specific embodiment of a hoof rasp according to the invention the initial stroke area has a width Wx equal to a traditional width of 44.5 mm.

In yet another specific embodiment of a hoof rasp according to the invention the width W is approximately 53 mm.

In a preferred embodiment of a hoof rasp according to the invention, the width W is at least 15% more and maximum 28% and preferably 20% more than the width Wx.

In yet another preferred embodiment of a hoof rasp according to the invention, the second end has a width W2 equal to the width Wx.

In another preferred embodiment of a hoof rasp according to the invention the first end comprises a narrower part with a width W1 which is less than the width W.

Preferably, the width W1 gradually becomes less over the length L1. Preferably, the width W1 is 32.5 mm.

In a preferred embodiment of a hoof rasp according to the invention the width W1 is at least 27% less than the width Wx.

The invention also relates to a method for rasping a hoof with a hoof rasp as described above, comprising the following steps: a) initiating the rasping via the narrowed area Wx with length Lx; and b) continuing the rasping via the wider area W with length L-Lx.

BRIEF DESCRIPTION OF THE DRAWINGS

With the intention of better showing the characteristics of the invention, a preferred embodiment of a hoof rasp according to the invention is described hereinafter, by way of an example without any limiting nature, with reference to the accompanying drawings wherein.

DESCRIPTION OF THE PREFERRED EMBODIMENTS

Figure 1:
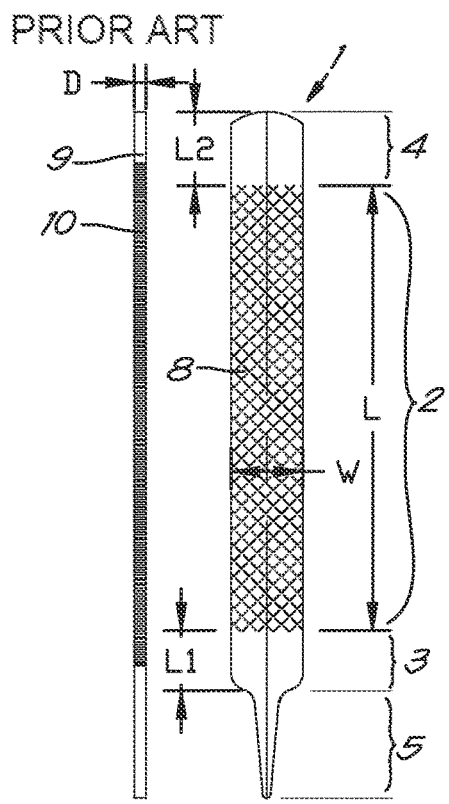
FIG. 1 schematically shows a top view of a known traditional hoof rasp.

A traditional hoof rasp 1, as shown for example in FIG. 1, has a width W of 44.5 mm and a total length of 426 mm. The thickness D of the rasp is 5 mm.

The top view shows a rasping side provided with a rasping section 2 with length L and width W between a rasp-free first and second end 3, 4 over a respective length L1 and L2, whereby the first end 3 tapers into a narrow tang 5 over which a handle is slid. The second end 4 is suitable to hold with the other hand during filing or rasping.

Teeth 10 are provided over the length L of the rasping section 2 on the side 9 of the rasp 1.

Figure 2:
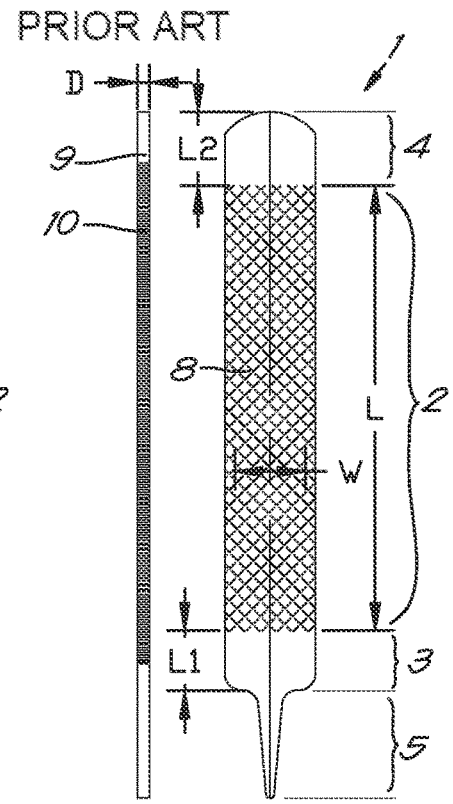
FIG. 2 schematically shows a top view of a known extra wide hoof rasp.

FIG. 2 shows an extra wide hoof rasp 1 that sells well but has a higher weight. In essence this oblong hoof rasp 1 has the same form as the hoof rasp 1 of FIG. 1. However, the rasp 1 of FIG. 2 is 57 mm wide for the same length and thickness D.

Figure 3:
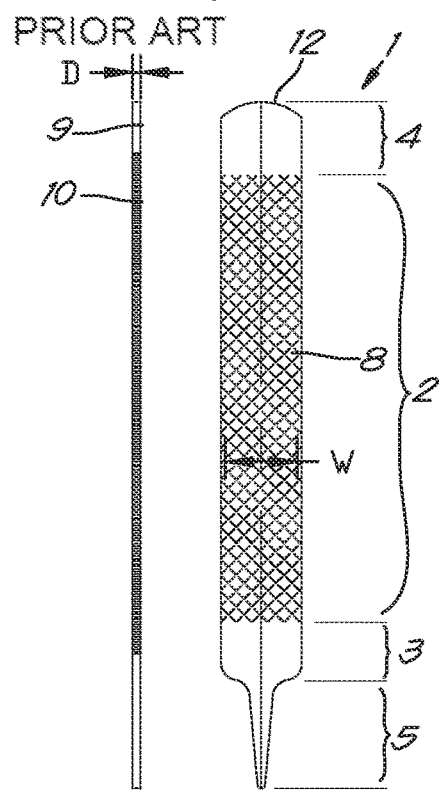
FIG. 3 schematically shows a top view of a known wide thinner hoof rasp.

FIG. 3 shows yet another known wide hoof rasp 1 of 50 mm wide. However, the rasp 1 is thinner than the two previous rasps, with a thickness D of 4.5 mm. This rasp 1 is thus lighter but has a slightly less wide rasping side.

Figure 4:
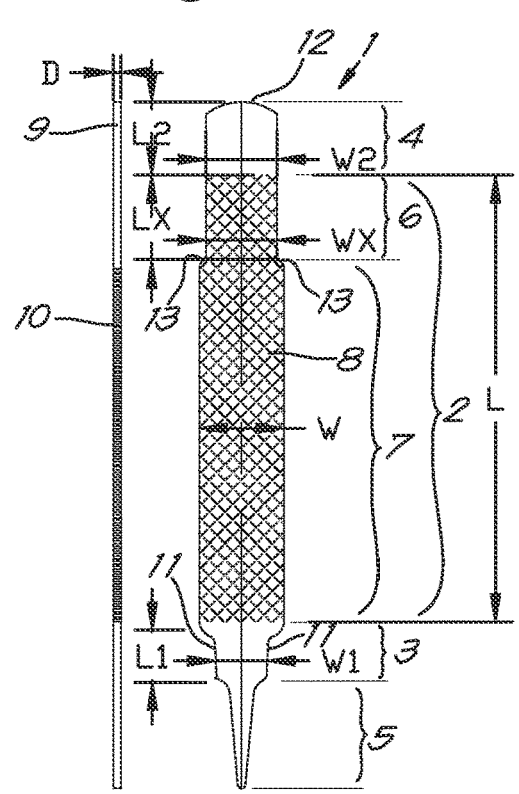
FIG. 4 schematically shows a top view of a hoof rasp according to the invention.

FIG. 4 shows a hoof rasp 1 according to the invention. This rasp 1 combines the advantages of known rasps, i.e. an acceptable weight and a rasping section 2 that is wide enough for a sufficient productivity. However, the rasp according to the invention also provides for a soft initial stroke 6 when rasping/filing thanks to the narrower initial stroke part 6 of the rasp. Once the rasping has picked up speed, the wider central rasping section 7 can be used. The narrower parts 6, 11 of the rasp 1 in the right places also keep the weight under control. The rasp 1 also has a stable feel in the hand during rasping.

The rasp 1 has the same total length of 426 mm as the aforementioned rasps. The central rasping section 7 of the rasp is more on the wide side with its approximately 53 mm. This width lies between that of the known rasps of FIGS. 2 and 3.

The second end 4 (further from the handle) of the rasp 1 is narrower (44.5 mm) for a soft initial stroke. This is the width of a traditional rasp 1 of FIG. 1.

When the rasping speed has picked up sufficiently after starting to rasp, a switch to the central rasping section 7 is carried out. This is also called the "area to speed up". This wider rasping section 7 has a width of at least 15% and maximum 28% and preferably more than 20% of the width of the narrower rasping section 6.

Still according to the invention, the section (first end) 3, 11 between the rasping section 2 and the tang 5 for the handle is made narrower. In this example this occurs gradually. Consequently it is possible to save on the weight. The width of the narrower part is 32.5 mm or amounts to 27% less than the width Wx.

To save even more weight, the rasp is thin with a thickness of 4.5 mm.

Such rasp 1 according to the invention is called a "hybrid rasp".

As shown on FIG. 4, the rasping section 2 (the part provided with "rasping" teeth) has a length L and a width W. The rasping section 2 is located between a rasp-free first and second end 3, 4.

The first end 3 has a length L1 and a width W1. The first end 3 tapers into a gradually narrowing tang 5 for a handle (handle not drawn on the figure).

The second end 4 has a length L2 and a width W2. The effective end 12 of the rasp 1 is slightly curved.

The narrowed "initial stroke" rasping section 6 has a width Wx and a length Lx. According to the invention Wx is less than W. The length Lx of the initial stroke section is approximately ¼ or ⅕ of the length L-Lx of the "fast" rasping section 7.

In the figure the teeth 8 of the rasping section 2 are provided up against the side of the rasp. The teeth 8 of the rasping section 2 can also stop at a distance from the side.

In the figure all teeth 8 of the rasping section 2 have the same form. The teeth 8 of the initial stroke part 6 can possibly be finer or located further away from each other, compared to the teeth 8 of the fast rasping section 7.

The side 9 of the fast rasping section 7 is provided with teeth 10. No teeth are provided on the side 9 of the narrower initial stroke part 6 and the two ends 3, 4 and the tang 5.

The initial stroke part 6 and the fast rasping section 7 are adjoining or adjacent to each other. In this example the transition 13 from width W to Wx is reasonably short. In another embodiment the transition 13 between the wide 7 and narrow 6 rasping section can be done gradually.

In yet another embodiment the initial stroke part 6 can be made conically. In the example of FIG. 4 the initial stroke part 6 has a constant width Wx.

In yet another embodiment the fast rasping section 7 can also become (slightly) narrower toward the end 3 of the handle. This can be advantageous for the weight.

The rasp 1 is preferably made symmetrically relative to the longitudinal centre line.

The present invention is by no means limited to the embodiment described as an example and shown in the drawing of a hoof rasp 1 according to the invention.

The invention claimed is:

1. A hoof rasp (1) for filing/rasping and tidying the hoof of a horse, comprising:
   a rasping side provided with a rasping section (2) with a length L between rasp-free first and second ends (3, 4) over respective lengths L1 and L2, the first end (3) tapering into a tang (5) for a handle, and the second end (4) configured for holding the hoof rasp (1), wherein the rasping section (2) comprises an initial stroke section (6) with a length Lx toward the second end (4), and a fast rasping section (7) that adjoins the initial stroke section (6) and has a length L-Lx, wherein the fast rasping section (7) has a constant width W, and the initial stroke section (6) has a width Wx that is less than the width W of the fast rasping section (7), and wherein the length Lx of the initial stroke section (6) is approximately ¼ or ⅕ of the length L-Lx of the fast rasping section (7), and a transition (13) from the width W of the fast rasping section (7) to the width Wx of the initial stroke section (6) is short.

2. The hoof rasp (1) according to claim 1, wherein the initial stroke section (6) and the fast rasping section (7) include teeth (8), and wherein the teeth (8) of the initial stroke section (6) are finer than the teeth (8) of the fast rasping section (7).

3. The hoof rasp (1) according to claim 2, wherein the hoof rasp (1) is further provided with a filing side.

4. The hoof rasp (1) according to claim 1, wherein the hoof rasp (1) further comprises a filing side.

5. The hoof rasp (1) according to claim 1, wherein the hoof rasp (1) is provided with teeth (10) in the fast rasping section (7) on at least one side (9).

6. The hoof rasp (1) according to claim 1, wherein the the width Wx of the initial stroke section (6) is constant.

7. The hoof rasp (1) according to claim 1, wherein an entire width W and Wx of the rasping section (2) is provided with teeth.

8. The hoof rasp (1) according to claim 1, wherein the width Wx of the initial stroke section (6) is symmetrically divided relative to a longitudinal centre line of the hoof rasp.

9. The hoof rasp (1) according to claim 1, wherein the hoof rasp (1) has a thickness of 4.5 mm.

10. The hoof rasp (1) according to claim 1, wherein the hoof rasp (1) has a total length of 426 mm.

11. The hoof rasp (1) according to claim 1, wherein the width Wx of the initial stroke section (6) is 44.5 mm.

12. The hoof rasp (1) according to claim 1, wherein the width W of the fast rasping section (7) is approximately 53 mm.

13. The hoof rasp (1) according to claim 1, wherein the width W of the fast rasping section (7) is at least 15% and maximum 28% more than the width Wx of the initial stroke section (6).

14. The hoof rasp (1) according to claim 1, wherein the second end (4) has a width W2 equal to the width Wx of the initial stroke section (6).

15. The hoof rasp (1) according to claim 1, wherein the first end (3) comprises a narrower part (11) with a width W1 which is less than the width W.

16. The hoof rasp (1) according to claim 15, wherein the width W1 is 32.5 mm.

17. The hoof rasp (1) according to claim 15, wherein the width W1 is at least 27% less than the width Wx.

18. The hoof rasp (1) according to claim 15, wherein the width W1 gradually becomes less over the length L1.

19. A method for rasping a hoof with the hoof rasp (1) according to claim 1, comprising the following consecutive steps:
  initiating rasping at a rasping speed with the narrowed area (6);
  increasing the rasping speed;
  switching the rasping from the narrowed area (6) to the fast rasping section (7); and
  continuing the rasping with the fast rasping section (7).

* * * * *